United States Patent
Magane et al.

(10) Patent No.: US 8,031,556 B2
(45) Date of Patent: Oct. 4, 2011

(54) OBSTACLE DETECTION APPARATUS

(75) Inventors: Fumimasa Magane, Anjo (JP); Hiroyuki Kani, Anjo (JP); Syotarou Tanaka, Obu (JP)

(73) Assignee: Denso Corporation, Kariya, Aichi Pref. (JP)

( * ) Notice: Subject to any disclaimer, the term of this patent is extended or adjusted under 35 U.S.C. 154(b) by 656 days.

(21) Appl. No.: 12/166,793

(22) Filed: Jul. 2, 2008

(65) Prior Publication Data

US 2009/0009306 A1 Jan. 8, 2009

(30) Foreign Application Priority Data

Jul. 5, 2007 (JP) ................................. 2007-177485

(51) Int. Cl.
*B60Q 1/00* (2006.01)
(52) U.S. Cl. ............................................ 367/99
(58) Field of Classification Search .............. 367/99, 367/909
See application file for complete search history.

(56) References Cited

U.S. PATENT DOCUMENTS

| 7,278,314 | B2 | 10/2007 | Sato et al. | |
|---|---|---|---|---|
| 2004/0090148 | A1* | 5/2004 | Kamei et al. ................. | 310/334 |
| 2009/0009306 | A1* | 1/2009 | Magane et al. ............... | 340/435 |

FOREIGN PATENT DOCUMENTS

| JP | 50-5791 | | | 1/1975 |
|---|---|---|---|---|
| JP | 51-66637 | | | 6/1976 |
| JP | 57-182666 | | | 11/1982 |
| JP | 60152968 | A | * | 8/1985 |
| JP | 5-22796 | | | 1/1993 |
| JP | 06070397 | A | * | 3/1994 |
| JP | 9-61514 | | | 3/1997 |
| JP | 9-86312 | | | 3/1997 |
| JP | 2003194939 | A | * | 7/2003 |
| JP | 2009014560 | A | * | 1/2009 |

OTHER PUBLICATIONS

Machine translation of JP06-70397.*
Japanese Office Action dated Oct. 20, 2009, issued in corresponding Japanese Application No. 2007-177485, with English translation.
Chinese Office Action dated Oct. 28, 2010, issued in corresponding Chinese Application No. 200810125096.9, with English translation.

* cited by examiner

*Primary Examiner* — Daniel Pihulic
(74) *Attorney, Agent, or Firm* — Nixon & Vanderhye PC

(57) ABSTRACT

An obstacle detection apparatus for a vehicle is provided. The apparatus includes an ultrasonic sensor and a controller. The ultrasonic sensor detects a presence of an obstacle around the vehicle and a distance to the obstacle by transmitting an ultrasonic wave and receiving the ultrasonic wave reflected by the obstacle. The controller controls the ultrasonic sensor. The ultrasonic sensor includes an ultrasonic wave element. The ultrasonic wave element has multiple resonance modes. The ultrasonic sensor changes a directivity of the ultrasonic sensor by selecting one of the multiple resonance modes of the ultrasonic wave element in accordance with a command signal output from the controller.

13 Claims, 12 Drawing Sheets

OBSTACLE DETECTION APPARATUS

CROSS REFERENCE TO RELATED APPLICATION

The present application is based on Japanese Patent Application No. 2007-177485 filed on Jul. 5, 2007, the disclosure of which is incorporated herein by reference.

BACKGROUND OF THE INVENTION

1. Field of the Invention

The present invention relates to an obstacle detection apparatus.

2. Description of Related Art

An obstacle detection apparatus for a vehicle has already been put to practical use. Such an obstacle detection apparatus detects a presence of an obstacle around a vehicle and a distance to the obstacle. This type of obstacle detection apparatus is utilized in, for example, a system (e.g., a clearance sonar system) that warns a driver of a vehicle about risk of probable collision between the obstacle and the vehicle. Also, this type of obstacle detection apparatus is utilized in a system (i.e., a parking assist system) that searches for a parking area for parking a vehicle therein, and guides a vehicle to enter the parking area.

Japanese Unexamined Patent Application Publication No. 2006-58281, corresponding to U.S. Pat. No. 7,278,314, has proposed an obstacle detection apparatus that includes a microphone (i.e., transducer) as a wave receiving element. In accordance with characteristics of the microphone, the apparatus is capable of variably setting a transmission wave frequency and a center frequency used in filtering.

In the above obstacle detection apparatus, the transmission wave frequency is variable, and thereby, it is possible to optimize the transmission wave frequency in accordance with characteristics of the microphone. According to the above apparatus, however, since the transmission wave frequency are optimized at a time when the obstacle detection apparatus is activated, the transmission wave frequency is not changed after the activation. In addition, the obstacle detection apparatus is configured such that, when a predetermined condition is satisfied after an obstacle detection operation is started, the transmission wave frequency is not switched.

A sensing range of a conventional obstacle detection apparatus is constant. The sensing range is determined by, for example, a directivity and sensing distance of the ultrasonic sensor.

A characteristic of an ultrasonic sensor required in detecting an obstacle located around the vehicle is typically different from that in detecting an obstacle located distant from the vehicle. Therefore, it has been difficult to improve performance of an obstacle detection apparatus required in both the above cases.

According to an ultrasonic sensor disclosed in Japanese Unexamined Patent Application Publication No. 2006-58281, when emphasis is placed on detecting an obstacle located close to the vehicle, it may be preferable to employ an ultrasonic sensor having a relatively-low directivity (i.e., a wide directivity) because it is possible to reduce an undetectable area around the vehicle. However, when an ultrasonic sensor having a low directivity is used for detecting an obstacle located distant from the vehicle, the ultrasonic sensor may receive a reflected ultrasonic wave coming from an undesired direction. As a result, error detection increases, and it becomes difficult to increase a sensing distance.

Inversely, when emphasis is placed on detecting an obstacle located distant from the vehicle, it may be preferable to employ an ultrasonic sensor having relatively-high directivity (i.e., a narrow directivity) because the ultrasonic sensor can reliably detect an obstacle existing in a desired direction. However, the use of the ultrasonic sensor with a high directivity increases an undetectable area around the vehicle. In other words, according to the ultrasonic sensor, it is difficult to both reduce of an undetectable area around a vehicle and to restrict error detection in connection with a distant obstacle.

Also, when a vehicle approaches an obstacle at a higher speed, the vehicle reaches the obstacle in a shorter time. Accordingly, when a vehicle speed is large, and when an ultrasonic sensor for detection of a nearby obstacle is employed, it is difficult to warn a driver about a probable collision between the vehicle and the obstacle at an appropriate time because the vehicle reaches the obstacle in a short time.

Inversely, when a vehicle speed is low, the vehicle reaches an obstacle in relatively long time. When an ultrasonic sensor for detecting a distant obstacle is employed in the low speed case, a user may be provided with an unnecessary warning notification such as beeping at a too early time.

Incidentally, a parking assist system searches for a parking area with the vehicle moving forward by using an ultrasonic sensor. Then, the parking assist system causes the vehicle to move backwards to enter the parking area. Therefore, it may be possible to use the same ultrasonic sensor as that used in the search for the parking area the When the vehicle moves backward while detecting an obstacle around the vehicle.

However, an ultrasonic sensor for searching for the parking area may typically have characteristics adapted for detecting a distant obstacle. Therefore, although it is possible to employ such an ultrasonic sensor to detect an obstacle located around the vehicle, there exits a large undetectable area around the vehicle.

SUMMARY OF THE INVENTION

In view of the above-described difficulty, it is an object of the present invention to provide an obstacle detection apparatus capable of detecting both a distance obstacle and a nearby obstacle.

According to a first aspect of the present invention, an obstacle detection apparatus for a vehicle is provided. The apparatus includes an ultrasonic sensor and a controller. The ultrasonic sensor detects a presence of an obstacle around the vehicle and a distance to the obstacle by transmitting an ultrasonic wave and receiving the ultrasonic wave reflected by the obstacle. The controller controls the ultrasonic sensor. The ultrasonic sensor includes an ultrasonic wave element. The ultrasonic wave element has multiple resonance modes. The ultrasonic sensor changes a directivity of the ultrasonic sensor by selecting one of the multiple resonance modes of the ultrasonic wave element in accordance with a command signal output from the controller.

According to the above obstacle detection apparatus, it is possible to detect both a relatively distance obstacle and a relatively nearby obstacle. It is possible to restrict error detection in detecting a relatively distance obstacle. It is possible to reduce an undetectable area in detecting a relatively nearby obstacle.

According to a second aspect of the present invention, an obstacle detection apparatus for a vehicle is provided. The obstacle detection apparatus includes an ultrasonic sensor that transmits and receives an ultrasonic wave to search for an obstacle. The ultrasonic sensor has a plurality of operational modes to changes both a directivity and a sensing distance of the ultrasonic sensor. The obstacle detection apparatus further includes a controller. The controller causes the ultrasonic sensor to change the directivity and the sensing distance of the ultrasonic sensor if a predetermined condition is met after the ultrasonic sensor starts searching for the obstacle.

According to the above obstacle detection apparatus, it is possible to detect both a relatively distance obstacle and a relatively nearby obstacle. It is possible to restrict error detection in detecting a relatively distance obstacle. It is possible to reduce an undetectable area in detecting a relatively nearby obstacle.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
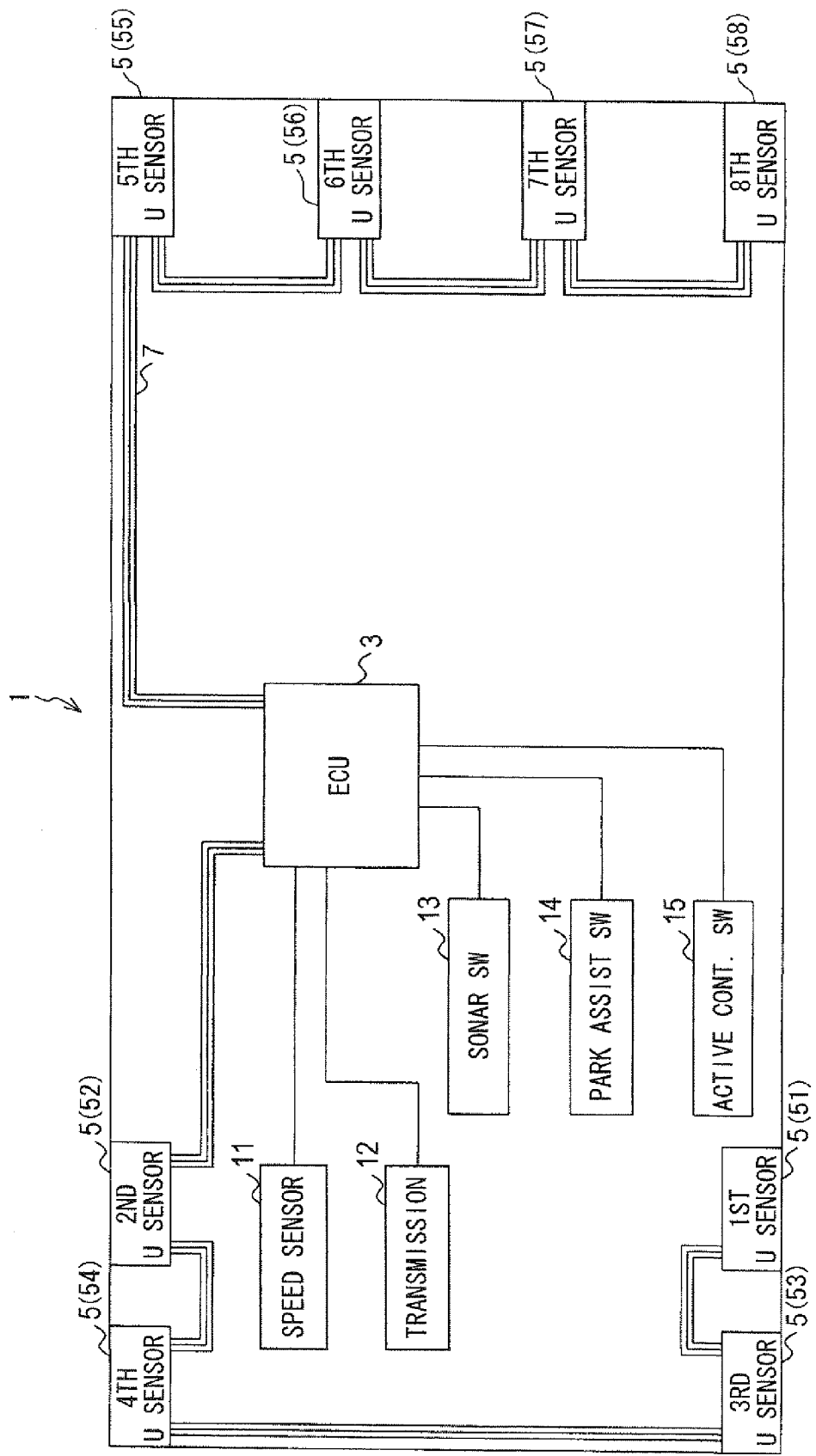
FIG. 1 is a block diagram illustrating a configuration of an obstacle detection apparatus.

An obstacle detection apparatus 1 according to a first embodiment is described below with reference to the accompanying drawings. FIG. 1 is a block diagram illustrating a configuration of an obstacle detection apparatus 1. The obstacle detection apparatus 1 includes an electronic control unit (ECU) 3 as a controller, multiple ultrasonic sensors 5, and a serial communication line 7. The multiple ultrasonic sensor 5 includes a first ultrasonic sensor 5(51), a second ultrasonic sensor 5(52), a third ultrasonic sensor 5(53), a fourth ultrasonic sensor 5(54), a fifth ultrasonic sensor 5(55), a sixth ultrasonic sensor 5(56), a seventh ultrasonic sensor 5(57), and an eighth sonic sensor 5(58). The obstacle detection apparatus 1 further includes a speed sensor 11, a transmission device 12, a clearance sonar activation switch 13, a parking assist system activation switch 14, and an active control setting switch 15, signals from which are input to the ECU 3 directly. Alternatively, the signals are input to the ECU 3 via another ECU (now shown).

Figure 2A:
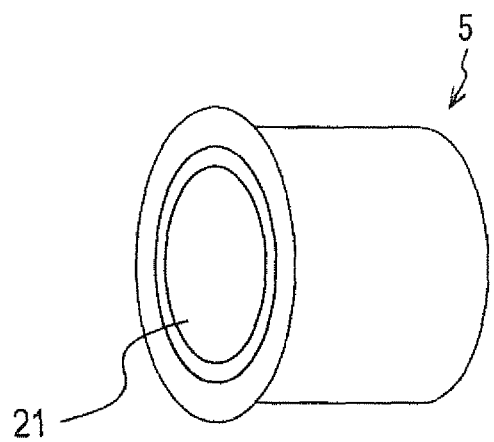
FIG. 2A is a perspective view of an ultrasonic sensor.
Figure 2B:
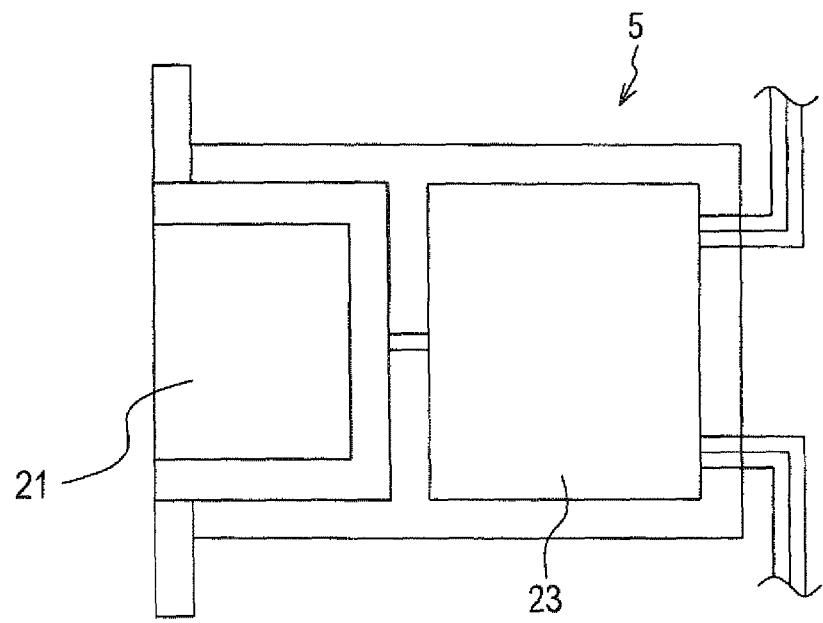
FIG. 2B is a cross sectional view of the ultrasonic sensor.
Figure 3:
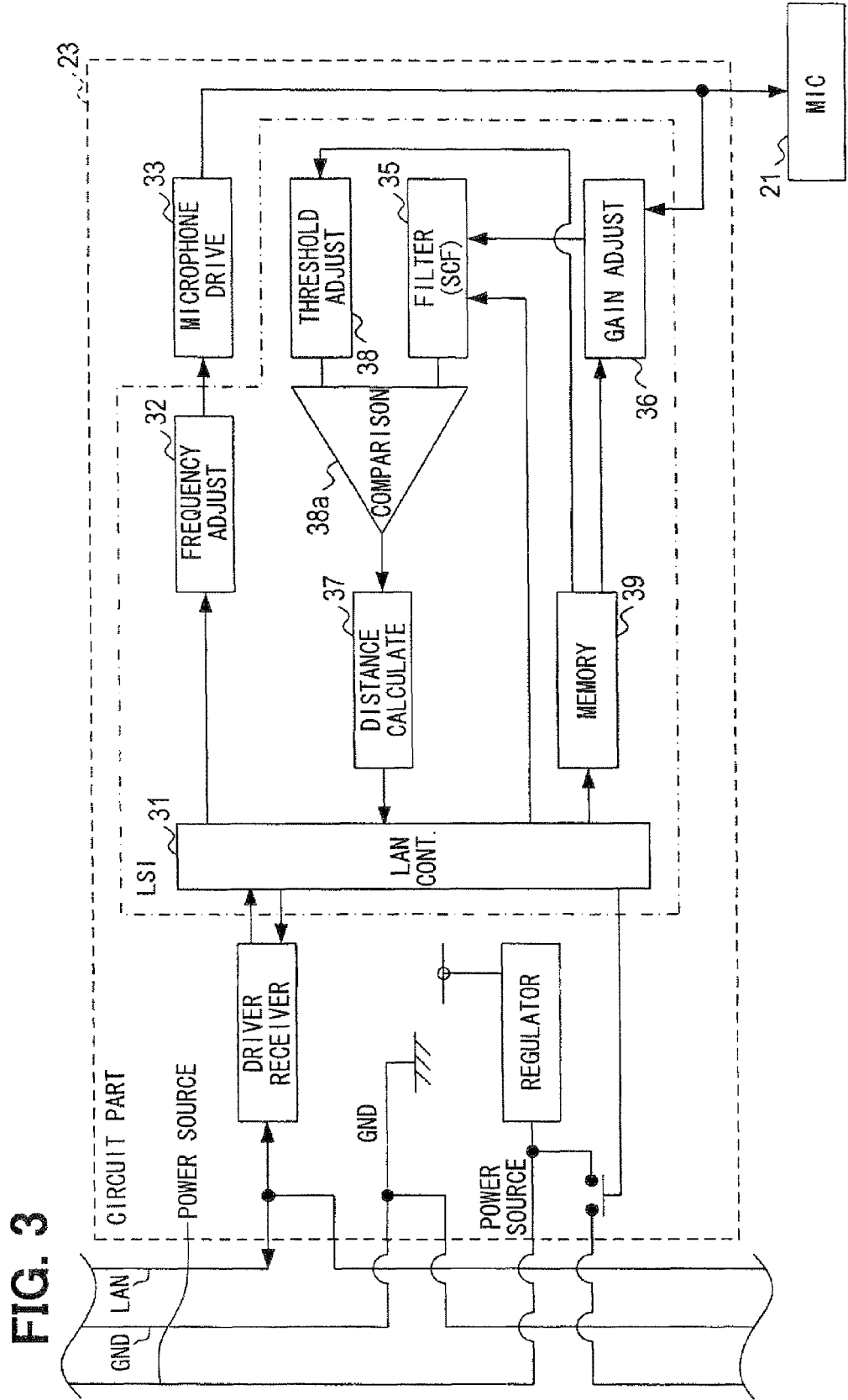
FIG. 3 is a block diagram illustrating a circuit configuration of the ultrasonic sensor.

Each ultrasonic sensor 5(51-58) can transmit an ultrasonic wave in a vehicle-forward direction and a vehicle-backward direction, and receives an ultrasonic wave reflected by an obstacle. Thereby, the ultrasonic sensor 5 detects the obstacle. FIG. 2A is a perspective view of each ultrasonic sensor 5(51-58). FIG. 2B is a cross sectional view of each ultrasonic sensor 5(51-58). As shown in FIG. 2B, each ultrasonic sensor 5(51-58) includes a microphone 21 and a circuit part 23. FIG. 3 is a block diagram illustrating an internal configuration of each ultrasonic sensor 5(51-58).

As shown in FIG. 3, the circuit part 23 includes a local area network (LAN) control circuit 31, a frequency adjust circuit 32, a microphone drive circuit 33, a filter circuit 35, a gain adjust circuit 36, a distance calculation circuit 37, a threshold adjust circuit 38, a comparison circuit 38A, and an nonvolatile memory 39.

Among the above circuits, the LAN control circuit 31, the frequency adjust circuit 32, the gain adjust circuit 36, the distance calculation circuit 37, the threshold adjust circuit 38, the comparison circuit 38A, and the memory 39 may be integrated and built in a large-scale integration circuit (LSI).

The ECU 3 transmits various communication frames. The LAN control circuit 31 receives the communication frames via the serial communication line 7 (c.f., FIG. 1). The LAN control circuit 31 transmits a polling frame for returning data of a measured distance to an obstacle. Here, each ultrasonic sensor 5(51-58) further includes a control circuit (not shown) that decodes a communication frame to obtain an informational content included in the communication frame.

The frequency adjust circuit 32 receives a frequency setting frame transmitted from the ECU 3. In the frequency setting frame, a transmission frequency is set. The frequency adjust circuit 32 sets or adjusts the transmission frequency to a transmission frequency of an ultrasonic wave pulse signal. The frequency adjust circuit 32 outputs the ultrasonic wave pulse signal with the transmission frequency to the microphone drive circuit 33.

The microphone drive circuit 33 drives the microphone 21 based on the ultrasonic pulse signal, and thereby, the microphone 21 transmits an ultrasonic wave. When the ultrasonic wave is reflected by an obstacle, and when the reflected ultrasonic wave is received with the microphone 21, a reception signal is output to the gain adjust circuit 36. The gain adjust circuit 36 refers to an informational item stored in the memory 39. The informational item is associated with a gain. The gain adjust circuit 36 amplifies the reception signal by multiplying the reception signal by a predetermined factor. The gain adjust circuit 36 outputs the amplified reception signal to the filter circuit 35.

The filter circuit 35 includes a filter circuit member. The filter circuit member filters the reception signal amplified in the gain adjust circuit 36. The filter circuit member passes a signal component of the reception signal. The passed signal component has a resonance frequency of the microphone 21. The filter circuit member is provided by, for example, a known switched capacitor filter (SCF) circuit.

In the above configuration, it is possible to provide the LSI with a filter circuit, which is capable of changing a center frequency used in the filtering. The filter circuit 35 also sets a center frequency, which is set in the frequency setting frame, to a center frequency used in the filtering.

The reception signal filtered in the filter circuit 35 is output to the comparison circuit 38A. The comparison circuit 38A compares between a level of the reception signal and a level of a threshold voltage for obstacle determination. The threshold voltage is set in the threshold adjust circuit 38. When the comparison circuit 38A determines that the level of the reception signal is larger than the level of the threshold voltage, the distance calculation circuit 37 converts a time span between transmitting the ultrasonic wave and receiving the reflected wave into a distance to the obstacle. The distance calculation circuit 37 outputs distance data to the LAN control circuit 31. The distance data indicate the distance to the obstacle.

Each ultrasonic sensor 5(51-58) can change a directivity and a sensing distance of the ultrasonic sensor 5(51-58). More specifically, the ultrasonic sensor 5(51-58) has multiple operational modes such as a long distance mode and a short distance mode. In the long distance mode, the ultrasonic sensor 5(51-58) has a high directivity (i.e., a narrow directivity) and a long sensing distance. In a short distance mode, the ultrasonic sensor 5(51-58) has a low directivity (i.e., a high directivity) and a short sensing distance.

When the ultrasonic sensors 5 transmits an ultrasonic wave in the long distance mode, the ultrasonic sensors 5 has a sensing range A1 and can detects obstacle located inside the sensing range A1. The sensing range A1 is illustrated by, for example, an area surrounded by line A1 in FIG. 4A. When the ultrasonic sensors 5 transmits an ultrasonic wave in the short distance mode, the ultrasonic sensors 5 has a sensing range A2 and can detect an obstacle located in a sensing range A2. The sensing range A2 is illustrated by, for example, an area surrounded by line A2 in FIG. 4A.

Figure 4A:
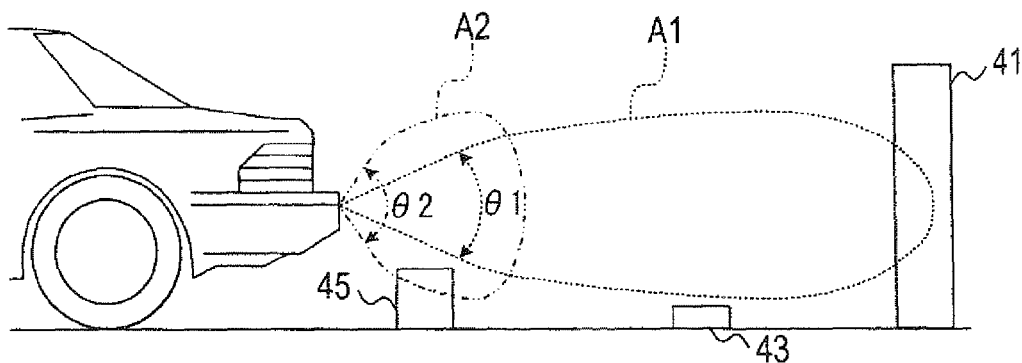
FIGS. 4A-4C are explanatory diagrams associated with a sensing range of the ultrasonic sensor.

The sensing distance in the long distance mode is larger than that in the short distance mode. Thus, in the long distance mode, an obstacle located more distant from the vehicle can be detected. Also, the directivity in the long distance mode is higher than that in the short distance mode. As shown in FIG. 4A, an angle θ1 is smaller than an angle θ2. In other words, each ultrasonic sensor 5(51-58) in the long distance mode have a narrow directivity. In the long distance mode, the ultrasonic sensor 5(51-58) may not be too sensitive to detect a distant object 43 located around a road surface.

On the other hand, the sensing distance in the short distance mode is shorter than that in the long distance mode. The directivity in the short distance mode is lower than in the long distance mode. As shown in FIG. 4A, the angel θ2 is larger than the θ1. In other words, each ultrasonic sensor 5(51-58) in the short distance mode has a low directivity (i.e., a wide directivity). For the above reason, an undetectable area around the vehicle reduces in the short distance mode. The ultrasonic sensors 5 can detect an obstacle located around the vehicle reliably.

Switching between such long and short distance modes is achieved by optimizing both the directivity and the sensing distance. Adjusting only one of the directivity and the sensing distance may not realize the above-described characteristic in the short and long distance modes.

Figure 4B:
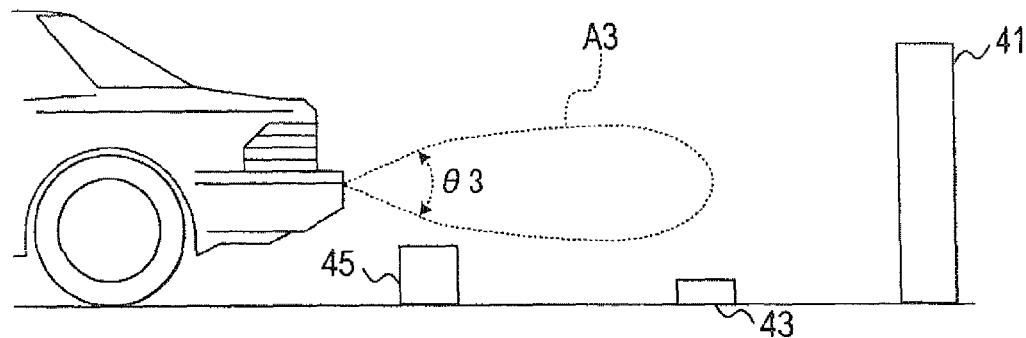

More specifically, when the sensing distance is adjusted to almost the same as that in the short distance mode and when the directivity is maintained at that in the long distance mode, the sensing range in this case is illustrated as an area A3 shown in FIG. 4B for instance. An angle θ3 of the area A3 is approximately equal to θ1 of the area A1. Therefore, an undetectable area around the vehicle does not reduce. Thus, an obstacle 45 located close to the vehicle may not be detected.

Figure 4C:
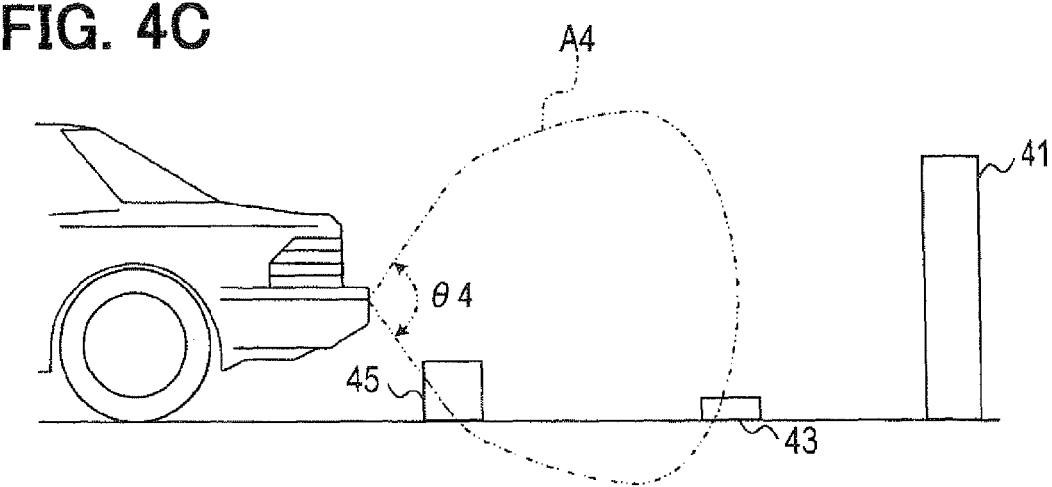

When the sensing distance is adjusted to almost the same as that in the long distance mode and when the directivity is maintained at that in the short distance mode, the sensing range in this case is illustrated as an area A4, as shown in FIG. 4C. An angle θ4 of the area A4 is almost equal to the angle θ2 of the area A2. Therefore, when it is required to detect an obstacle 41 located distant from the vehicle, an obstacle detection apparatus may detect another object 43, which is not required to be detected, due to excessive sensitivity.

For the above reason, it may be necessary to change both the directivity and the sensing distance of each ultrasonic sensor 5(51-58) when the operational mode of the ultrasonic sensor 5(51-58) is switched between the long distance mode and the short distance mode. Here, an increase in the sensing distance of each ultrasonic sensor 5 is achieved by increasing an output of the transmission wave. If necessary, it is possible to increase the sensing distance of the ultrasonic sensor 5 by increasing in reception sensitivity of the ultrasonic sensor 5(51-58). Further, an increase in the directivity of the ultrasonic sensor 5(51-58) (i.e., narrowing directivity) is achieved by increasing a frequency of the transmission wave. In the present embodiment, each ultrasonic sensor 5(51-58) includes a single element for wave transmission. The transmission wave frequency is changed by driving the single element for wave transmission at different drive frequencies. In other words, the single element has multiple resonance modes, and the ultrasonic sensor 5 changes the directivity by selecting one of the multiple resonance modes of the ultrasonic wave element in accordance with a command signal output from the controller. Further, the multiple resonance modes of the single element include a high frequency mode and a low frequency mode. The ultrasonic sensor 5 selects and uses the high resonance mode to sense a distant obstacle. The ultrasonic sensor 5 selects and uses the low resonance mode to sense a nearby obstacle. The above configuration makes it possible to utilize the single element effectively. Further, it is possible to simplify a configuration of hardware. Alternatively each ultrasonic sensor 5(51-58) may include multiple elements for wave transmission, and one of or some of the multiple elements may be selectively driven.

The ECU 3 controls switching the operational mode of each ultrasonic sensor 5(51-58) between the long and short distance modes. The ECU 3 also controls an ultrasonic wave transmission. More specifically, the ECU 3 outputs a mode switch command frame, a wave transmission command frame, a polling frame and the like to the ultrasonic sensor 5 via the serial communication line 7. The mode switch command frame causes the ultrasonic sensor 5(51-58) to change a frequency and a level of the ultrasonic wave to be transmitted. The wave transmission command frame causes the ultrasonic sensor 5 to transmit an ultrasonic wave. The polling frame causes the ultrasonic sensor 5 to outputs an information signal associated with the detected distance to an obstacle.

The mode switch command frame includes various fields such as a sensor ID field, a message ID field, a transmission wave output level field, a transmission wave frequency field, a filter center frequency field, an error check code (ECC) field, and the like.

The sensor ID field includes an informational item associated with an ID for each ultrasonic sensor 51-58. Herein, each ultrasonic sensor 5(51-58) has a preliminarily-assigned ID. Each ultrasonic sensor 5(51-58) refers to the informational item included in the sensor ID field. Thereby, the ultrasonic sensor 5(51-58) determines whether the ultrasonic sensor 5(51-58) is required to refer to an informational item or a command in the inputted mode switch command frame.

The massage ID field includes an informational item associated with an ID for distinguishing the above-described various frames. Each ultrasonic sensor 51-58 refers to the message ID field, and thereby, determines which kind of frames has been input.

The mode switch command frame further includes fields that follow the massage ID field. The fields include information items associated with a level and a frequency of an ultrasonic wave to be transmitted by the ultrasonic sensor 5(51-58), and a center frequency for the filer circuit 35 to perform the filtering. When the ID in the massage ID indicates that the input frame is the mode switch command frame, each ultrasonic sensor 51-58 refers to the above fields, and each ultrasonic sensor 51-58 determines and set the level and frequency of transmission wave, and the center frequency.

The level and frequency of an ultrasonic wave to be transmitted, and the center frequency are set in the mode switch command frame in accordance with switching the operational mode of the ultrasonic sensor 5 between the long and short distance modes in the below-described procedures.

Control procedures performed by the ECU 3 in a clearance sonar operation are described below with reference to the FIGS. 5-8. The control procedures are started when an ignition switch is turned on. The control procedures ends when the ignition switch is turned off.

When the control procedures start, the ECU 3 determines at S105 whether the clearance sonar activation switch 13 is in an ON state or not. Regarding the clearance sonar activation switch 13, a user may arbitrarily turn on and off the switch 13. The clearance sonar activation switch 13 thus may be turned on when the user requires the clearance sonar operation to be performed.

When it is determined that the clearance sonar activation switch 13 is in the on state, corresponding to "NO" at S105, procedure wait until the clearance sonar activation switch 13 is turned on. In other words, procedure returns to S105.

When it is determined that the clearance sonar activation switch 13 is in the on state, corresponding to "YES" at S105, procedure proceeds to S110. The ECU 3 determines at S110 whether a shift range of the transmission device 12 is in P (i.e., P: a parking range).

When it is determined that the shift range is in "P", corresponding to "YES" at S110, procedure returns to S105. In other words, the procedures from S105 to S110 are repeatedly performed until the following conditions are satisfied. The conditions are that the clearance sonar activation switch is turned on and the shift range is in a position other than "P".

When it is determined that the shift range is not in "P", corresponding to "NO" at S110, procedure proceeds to S115. The ECU 3 selects at S115 one or more ultrasonic sensor 51-58 that correspond to the position of the shift range. The procedure at S115 is more specifically described below with reference to FIG. 6.

At S205, the ECU 3 determines whether the shift range is in "R" (i.e., R: a reverse range or a reverse gear position) or not. When it is determined that the shift range is in "R", corresponding to "YES" at S205, process proceeds to S210. The ECU 3 sets at S210 a variable "n" to "8" and selects all ultrasonic sensors 51-58 as controlled objects.

When it is determined that the shift range is not in "R", corresponding to "NO" at S205, process proceeds to S215. At S215, the ECU 3 sets the variable "n" to "4" and selects the first to fourth ultrasonic sensors 51-54 as controlled objects. The first to fourth ultrasonic sensors 51-54 are disposed in a front side of the vehicle.

In S210 and S215, the variable "n" is set to the maximum ordinal number of the ultrasonic sensor among the controlled objects. Thereby, the ECU 3 recognizes the first to n-th ultrasonic sensors as the controlled objects in the following procedures and processes.

Figure 5:
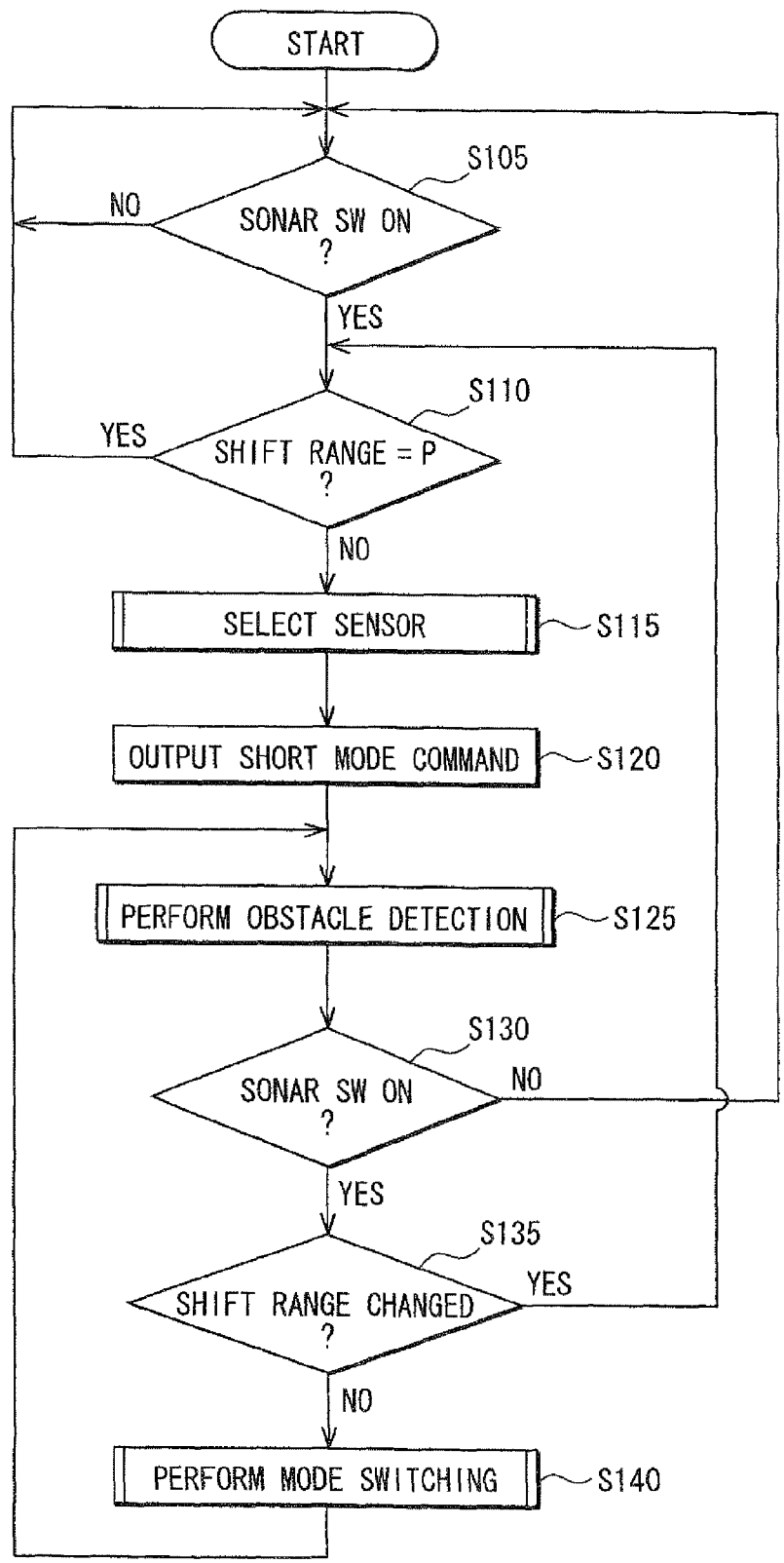
FIG. 5 is a flow chart associated with a clearance sonar control operation.
Figure 6:
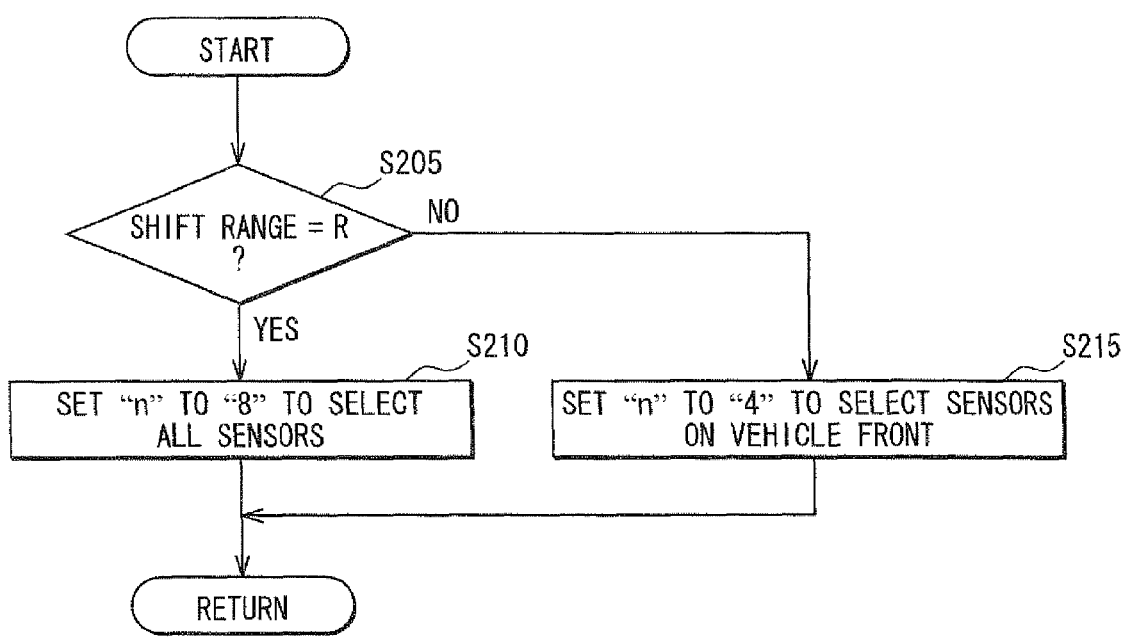
FIG. 6 is a flow chart associated with a procedure for selecting ultrasonic sensors corresponding to a shift range position.

After the ECU 3 has performed the process S210 or S215, process routine associated with FIG. 6 returns, that is, the procedure S115 associated with FIG. 5 ends. Then, procedure proceeds to S120. At S120, the ECU 3 outputs the short distance mode setting command to the first to n-th ultrasonic sensors.

At S120, the above-explained mode switch command frame is output to each of the first to n-th ultrasonic sensors. Here the number set in the variable "n" corresponds to that set at S210 or S215. As a result of the procedure S120, each of the first to n-th ultrasonic sensors is switched into the short distance mode. In the short distance mode, the ultrasonic sensor has a low directivity (i.e., a wide directivity) and a short sensing distance.

A reason why the ultrasonic sensor 5 firstly operates in the short distance mode is as follows. There is a possibility that there exists an obstacle located remarkably close to the vehicle when the clearance sonar operation is started. In order to reliably detect such an obstacle, it may be preferable to reduce an undetectable area around the vehicle.

Also, there is a possibility that an obstacle located distant from the vehicle exists when the clearance sonar operation is started. A possibility of a collision between the vehicle and such a distant obstacle may be lower than that between the vehicle and a nearby obstacle. Therefore, firstly, the operational mode of the ultrasonic sensor 5 is switched into the short distance mode in order to detect a nearby obstacle. Then, the operational mode may be switched into the long distance mode to check a distant obstacle.

After the above-described procedure, the ECU 3 performs an obstacle detection procedure at S125. Specification of the procedure S125 corresponds to processes associated with FIG. 7. The processes are described below with reference to FIG. 7. At S305, the ECU 3 outputs the ultrasonic wave transmission command to the first to n-th ultrasonic sensors. Accordingly, each of the first to n-th ultrasonic sensors transmits an ultrasonic wave and receives the reflected ultrasonic wave. Based on results of the transmission wave and the received wave, each ultrasonic sensor senses a presence of an obstacle and a distance to the obstacle.

After the process S305, the ECU 3 obtains information on an obstacle from each of the first to n-th ultrasonic sensors at S310. More specifically, the ECU 3 outputs a signal to the first to n-th ultrasonic sensors, the signal being associated with a request to send the information on an obstacle. When each of the first to n-th ultrasonic sensors receives the request to send the information, the first to n-th ultrasonic sensors outputs an information signal on an obstacle to the ECU 3. Thereby, the ECU 3 obtains the information on an obstacle. The information on an obstacle indicates a presence of an obstacle and the distance to the obstacle.

At S315, the ECU 3 determines whether one or more ultrasonic sensors sense an obstacle. When it is determined that one or more ultrasonic sensors sense an obstacle, corresponding to "YES" at S315, process proceeds to S320. The ECU 3 determines at S320 whether a present vehicle speed V is larger than a threshold V1.

When it is determined that the present vehicle speed V is less than or equal to the threshold V1, corresponding to "NO" at S320, the ECU 3 causes at S325 a warning lights to turn on. The warning light that turned on corresponds to the ultrasonic sensors which have sensed an obstacle. At S330, the ECU 3 causes generation of sound for warning. The sound for warning may change in accordance with the measured distance to the obstacle.

When it is determined that one or more ultrasonic sensors sense an obstacle, corresponding to "YES" at S315, and when it is determined that the present vehicle speed V is larger than the threshold V1, corresponding to "YES" at S320, the ECU 3 causes at S335 the warning light to turn off. At S340, the ECU 3 causes stopping the generation of the sound for warning.

When the vehicle travels at a speed exceeding the threshold V1, it can be assumed that a user does not require such a warning in a clearance sonar operation. Therefore, a user may not have unnecessary surprise due to the generation of the sound when the vehicle travels at a speed exceeding the threshold V1.

When it is determined that none of the ultrasonic sensors senses an obstacle, corresponding to "NO" at S315, the ECU 3 causes at S335 the warning light to turn off. At S340, the ECU 3 stops the generation of the sound for warning.

Figure 7:
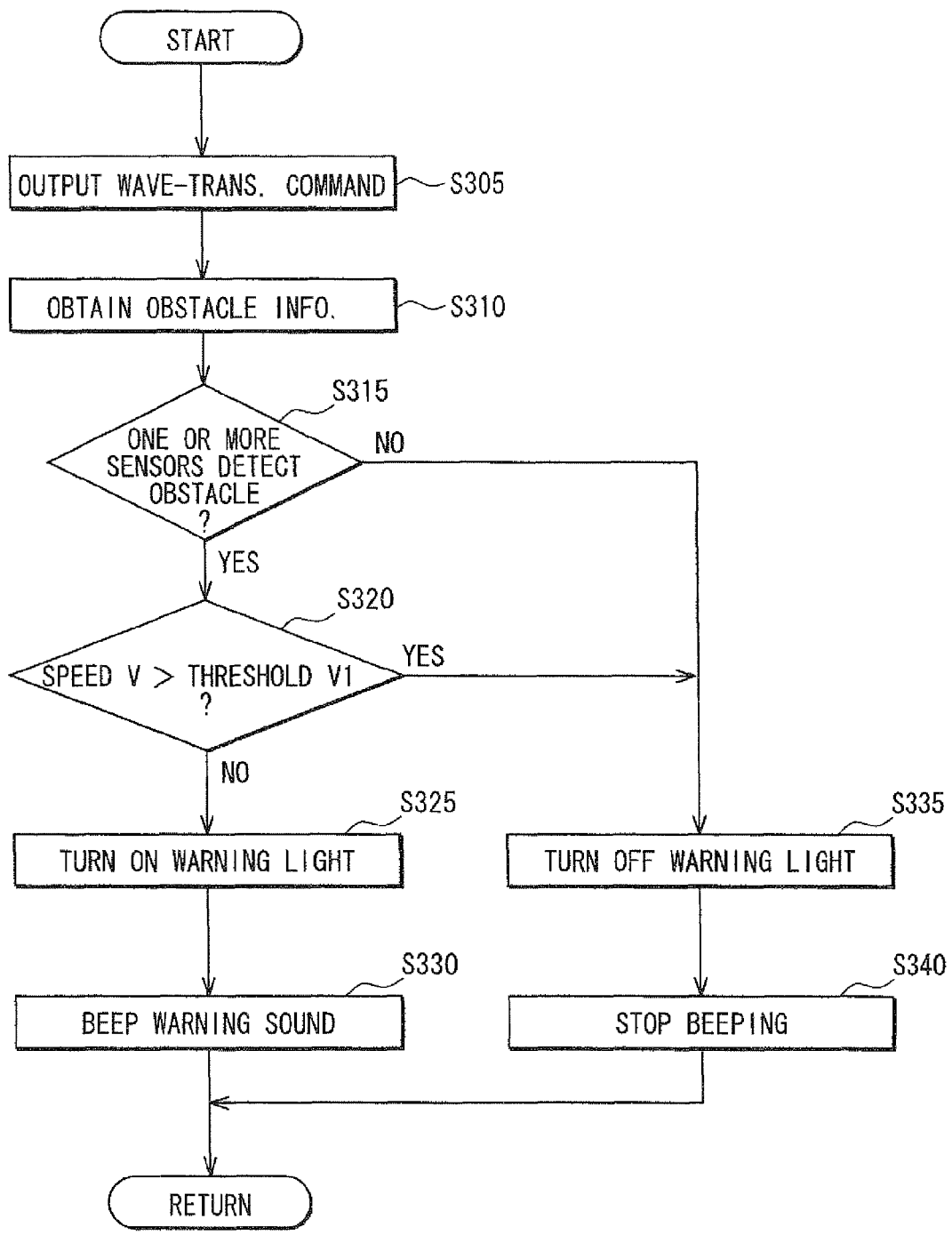
FIG. 7 is a flow chart associated with an obstacle detection procedure.
Figure 8:
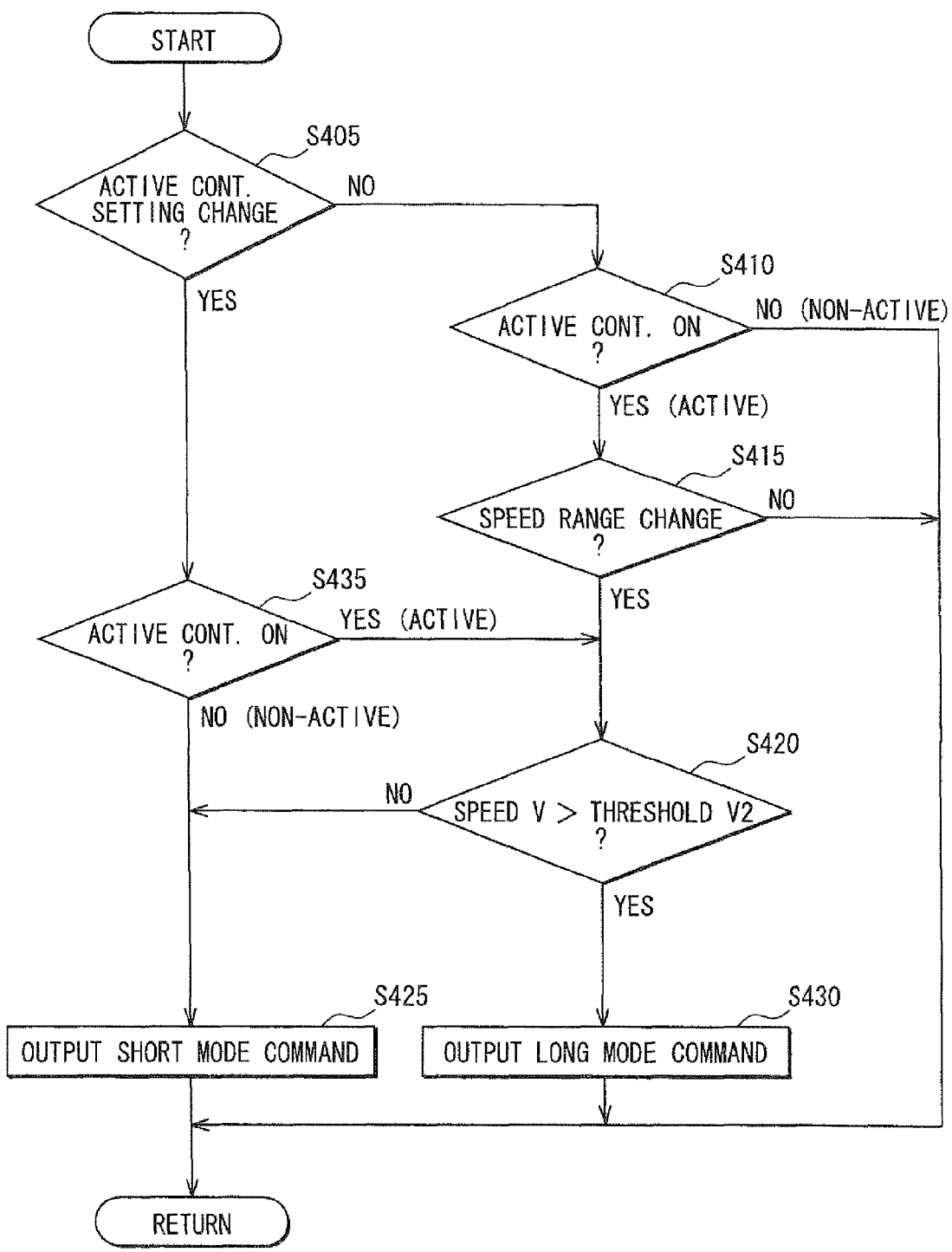
FIG. 8 is a flow chart associated with an operational mode switching procedure according to a first embodiment.

After process routine associated with FIG. 7 returns, that is, after procedure S125 finishes, procedure proceeds to S130. The ECU 3 determines at S130 whether the clearance sonar activation switch 13 is in the on state.

When it is determined that the clearance sonar activation switch 13 is not in the on state, corresponding to "NO" at S130, procedures returns to S105 and procedure waits until the clearance sonar activation switch 13 is turned on. A determination that the clearance sonar activation switch 13 is not in the on state at S130 may indicate that a user has turned off the clearance sonar activation switch 13.

When it is determined that the clearance sonar activation switch 13 is in the on state, corresponding to "YES" at S130, the ECU 3 determines at S135 whether the shift range in the transmission device 12 is changed or not. More specifically, in S135, positions of the shift range are classified into three predetermined group. When the shift range is switched from a position in one predetermined group to a position in another predetermined group, it is determined at S135 that the shift range is switched. The three predetermined groups of shift range positions are a first group of shift range positions, a second group of shift range positions, and a third group of shift range positions, respectively. The first group of shift range positions includes, for example, a position "P". The second group of shift range positions includes for example, a position "R". The third group of shift range positions includes positions other than "P" and "R", more specifically, includes positions "N", "D", "B", and the like (i.e., N: a neutral range, D: a drive range or a forward movement position, B: a brake range).

When it is determined that the shift range is switched, corresponding to "YES" at S135, procedure returns to S110 because it may be necessary to stop the obstacle detection procedure or to change the controlled objects. After procedure returns to S110, when it is determined that the range position is in "P", process further returns to S105. Meanwhile, when the shift range is in a position other than "P", procedure proceeds to S115, and selection of the controlled objects (i.e., ultrasonic sensor) is made again.

When it is determined that the shift range is not changed, corresponding to "NO" at S135, the ECU 3 performs at S140 an operational mode switching procedure.

According to the present embodiment, in the operational mode switching procedure at S140, the operational mode of each of the first to n-th ultrasonic sensors is switched in accordance with a speed of the vehicle. The operational mode switching procedure at S140 is more specifically described below with reference to FIG. 8.

At S405, the ECU 3 determines whether a change in an active control setting is made or not. Herein, the active control setting is a setting that determines whether the ECU 3 performs switching the operational mode between the short distance mode and the long distance mode. Using the active control setting switch 15, a user can change the active control setting in accordance with user preference for instance. At S405, the ECU 3 confirms whether a change in the active control setting is made or not.

It is considered that, typically, the active control setting is not frequently changed. Accordingly, in many cases, it is likely that the ECU 3 determines that a change in the active control setting is not made. When the ECU 3 determines that no change is made in the active control setting, corresponding to "NO" at S405, process proceeds to S410. The ECU 3 determines at S410 whether the active control setting indicates that active control is enabled (i.e., ON) or disabled (i.e., OFF).

In other words, when it is determined that no change is made in the active control setting, there are two cases as to what is indicated by the active control setting. One case is that active control is disabled. The other case is that the active control is enabled. The above cases are distinguished at S410.

Here a determination "NO" at S410 corresponds to a determination that the active control setting indicates that active control is disabled. In this case, it is sufficient to maintain the operational mode of the first to n-th ultrasonic sensors at the short distance mode, and process routine associated with FIG. 8 returns.

When the active control setting indicates that active control is enabled, corresponding to "YES" at S410, the operational mode is switched based on a speed of the vehicle in the present embodiment. More specifically, the ECU 3 determines at S415 whether the vehicle speed is changed from that in one speed range to that in another speed range.

When the speed of the vehicle reaches a predetermined threshold V2 from lower speeds (i.e., by acceleration), the ECU 3 determines at S415 that the vehicle speed is changed from that in one speed range to that in another speed range, corresponding to "YES" at S415. Also, when the speed of vehicle reaches the predetermined threshold V2 from higher speeds (i.e., by deceleration), the ECU 3 determines that the vehicle speed is changed from that in one speed range to that in another speed range, corresponding to "YES" at S415.

When it is determined that the vehicle speed is changed from that in one speed range to that in another speed range, corresponding to "YES" at S415, process proceeds to S420. The ECU 3 determines at S420 whether a present vehicle speed V is larger than the predetermined threshold V2. When it is determined that the present vehicle speed V is less than or equal to the predetermined threshold V2 (i.e., the vehicle speed V is in a low speed range), corresponding to "NO" at S420, process proceeds to S425. At S425, the ECU 3 outputs the short distance mode setting command to the first to n-th ultrasonic sensors. When the present vehicle speed V is larger than the predetermined threshold V2 (i.e., the vehicle speed V is in a higher speed range), corresponding to "YES" at S420, process proceeds to S430. At S430, the ECU 3 outputs the long distance mode setting command to the first to n-th ultrasonic sensors at S430.

That is, when the vehicle speed is in the high speed range, the ultrasonic sensor 5 has a characteristic suitable for detecting an obstacle located distant from the vehicle. When the vehicle speed is in the low speed range, the ultrasonic sensor 5 has a characteristic suitable for detecting an obstacle located close to the vehicle.

In the above-described processes S415 and S420, for simplicity, the predetermined threshold V2 separates the high speed range from the low speed range. Alternatively, the ECU 3 may determines at S415 that the vehicle speed is changed from that in one speed range to that in another speed range in the following cases. One case is that the speed of the vehicle reaches a predetermined first threshold V2a from higher speeds. The other case is that the speed of the vehicle reaches a predetermined second threshold V2b from lower speeds. In the above alternative configuration, the predetermined second threshed V2b is set to be larger than the predetermined first threshed V2b (i.e., V2b>V2a). The above alternative configuration can provide a condition for switching the operational mode with hysteresis. Therefore, when the speed of the vehicle fluctuates around a threshold, it is possible to restrict the frequent and repeated switching of the operational mode.

When it is determined that the vehicle speed is not changed from that in one speed range to that in another speed range, corresponding to "NO" at S415, it is sufficient for the ECU 3 to maintain the operational mode at the present operational mode, which is the short distance mode or the long distance mode. In the above case, process routine associated with FIG. 8 returns.

The above-described processes are performed when the ECU 3 determines that a change in the active control setting is not made. In some cases, it is determined that a change in the active control setting is made, corresponding to "YES" at S405. The determination that a change in the active control setting corresponds to a case where, for example, the active control setting switch 15 has been switched by a user. The switching of the active control setting switch 15 includes two cases. One case is that the active control is switched from "OFF" into "OFF". The other case is that the active control is switched from "ON" into "OFF". The two cases are distinguished at S435. In other words, the ECU 3 determines at S435 whether the active control is switched into "ON" or "OFF". When the ECU 3 determines that the active control is switched into "OFF", corresponding to "NO" at S435, process proceeds to the above-explained S425 since each ultrasonic sensor is configured to operate at the short distance mode when the active control is in "OFF".

When it is determined that the active control is switched in "ON", corresponding to "YES" at S435, process proceeds to the above-explained S420 in order to switch the operational mode of the ultrasonic sensor 5 taking into account the present speed of the vehicle. In the above case, when the vehicle speed V is in the low speed range (i.e., V≦V2), the operational mode of each ultrasonic sensor is set to the short distance mode. When the speed V is in the high speed range (i.e., V>V2), the operational mode of each ultrasonic sensor is set to the long distance mode.

When the above-described process routine S405-435 finishes, that is, when procedure S140 associated with FIG. 5 finishes, procedure returns to S125. Then, procedure routine S125 to S140 are repeatedly performed unless the clearance sonar activation switch 13 is switched off, or unless the shift range is switched. The obstacle detection procedure S125 is repeatedly performed.

According to the obstacle detection apparatus 1, as explained above, a characteristic of the ultrasonic sensor 5 can be dynamically switched after the clearance sonar operation is started. Therefore, the obstacle detection apparatus 1 is capable of detecting both relatively distant obstacle and relatively nearby obstacle. Moreover, it is possible to restrict error detection in detecting the relatively distant obstacle. Moreover, it is possible to reduce the undetectable area in detecting the relatively nearby obstacle.

Further, according to the present embodiment, the obstacle detection apparatus 1 switches the directivity and the sensing distance of the ultrasonic sensor. When the vehicle speed is large, it is possible to reliably detect an obstacle located distant from the vehicle. Therefore, it is possible to take action such as issue an early alert about the obstacle, etc.

When the speed of the vehicle is low, the obstacle detection apparatus 1 is configured to detect only an obstacle located close to the vehicle. Therefore, it is possible to restrict issuing a too-early alert about an approaching obstacle.

Moreover, according to the above obstacle detection apparatus 1, it is possible for a user to operate the active control setting switch 15 to enable for the ultrasonic sensor 5 to change the directivity and the sensing distance. Accordingly, it is possible for a user to disable for the ultrasonic sensor 5 to switch the directivity and the sensing distance when the user does not require the change.

Second Embodiment

An obstacle detection apparatus 1 according to a second embodiment is described below.

In the second embodiment, the directivity and the sensing distance of the ultrasonic sensors 5 are changed based on a distance to an obstacle detected with the ultrasonic sensors 5. More specifically, in switching the operational mode of the ultrasonic sensor 5, the obstacle detection apparatus 1 according to the present embodiment performs procedure S140 corresponding to the below-described processes associated with FIG. 9. It should be noted that the apparatus 1 according to the first embodiment performs procedure S140 corresponding to the above-described processes S405 to S435 associated with FIG. 8.

Figure 9:
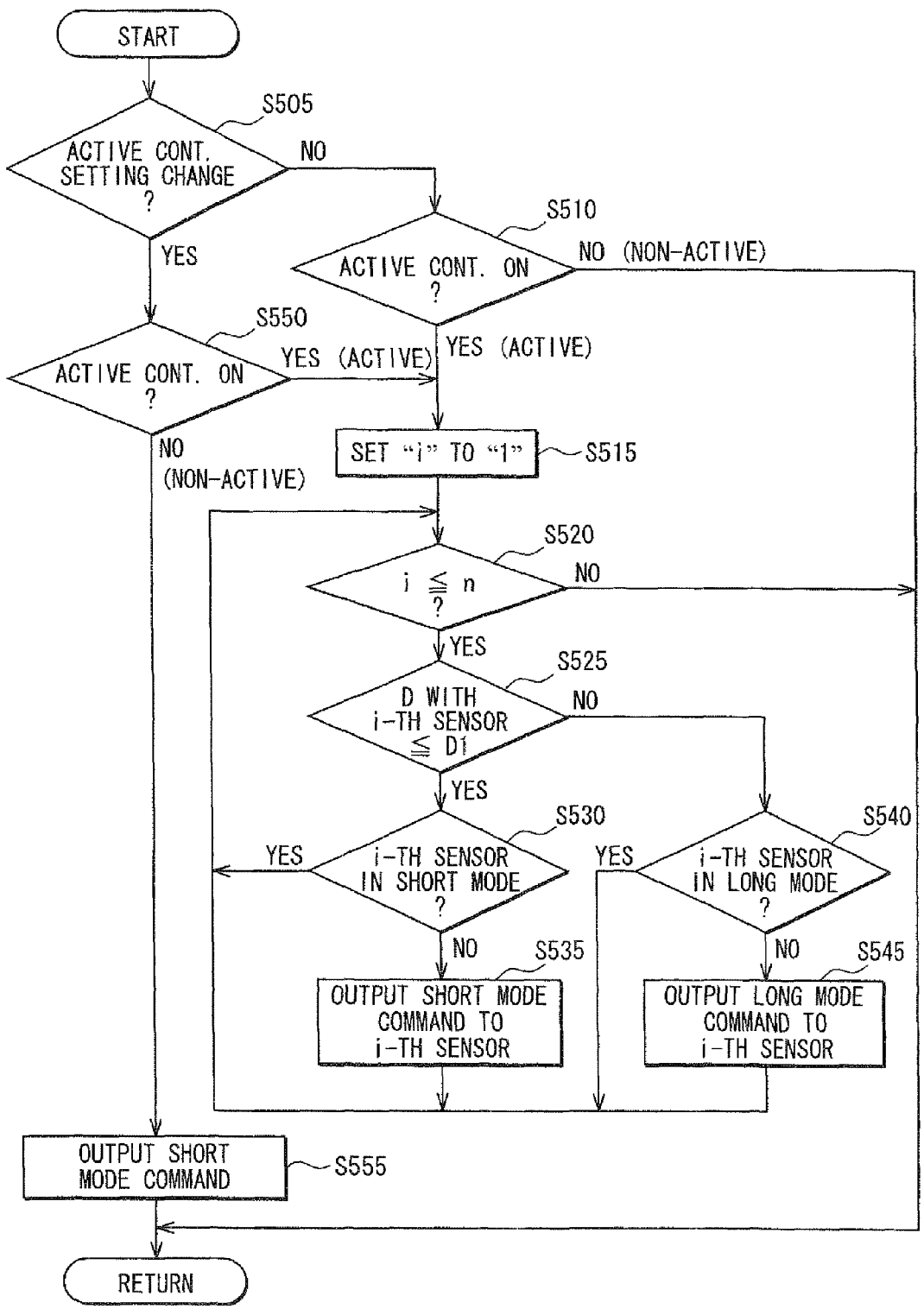
FIG. 9 is a flow chart associated with an operational mode switching procedure according to a second embodiment.

According to the present embodiment, as shown in FIG. 9, the ECU 3 determines at S505 whether a change is made in an active control setting. When it is determined that no change is made in the active control setting, corresponding to "NO" at S505, the ECU 3 determines at S510 whether the active control is in "ON" (i.e., enabled). The above processes according to the present embodiment correspond to the processes S405 and S410 according to the first embodiment.

When it is determined that the active control is not in "ON" (i.e., disabled), corresponding to "NO" at S510, process routine associated with FIG. 9 returns. In this case, it is sufficient for each of the first to n-th ultrasonic sensors to maintain the operation mode at the short distance mode.

When it is determined that the active control is in "ON", corresponding to "YES" at S510, the operational mode of the ultrasonic sensors 5 are switched on the basis of a distance to an obstacle detected with an ultrasonic sensor 5.

More specifically, the ECU 3 sets a loop counter "i" to "1" at S515, and the ECU 3 determines at S520 whether the ECU 3 has finished performing a loop processing a given number of times. The given number of times is equal to the number "n" of the control objects.

When it is determined that the ECU 3 has not finished performing the loop processing the given number of times, corresponding to "YES" at S520, process proceeds to S525. At S525, the ECU 3 determines whether a distance D to an obstacle detected with the i-th ultrasonic sensor is less than or equal to a threshold D1.

When it is determined that the distance D to an obstacle detected with the i-th ultrasonic sensor is less than or equal to the threshold D1, corresponding to "YES" at S525, process proceeds to S530. At S530, the ECU determined whether the i-th ultrasonic sensor is in the short distance mode. When it is determined that the i-th ultrasonic sensor is not in the short distance mode, corresponding to "NO" at S530, process proceeds to S535. At S535, the ECU outputs the short distance mode setting command to the i-th ultrasonic sensor, and process returns to S520. When it is determined that the i-th ultrasonic sensor is in the short distance mode, corresponding to "YES" at S530, process returns to S520 with S535 skipped.

When it is determined that the distance D to an obstacle detected with the i-th ultrasonic sensor is less than or equal to the threshold D1, corresponding to "NO" at S525, process proceeds to S540. At S540, the ECU determines whether the i-th ultrasonic sensor is in the long distance mode or not. When it is determined that the i-th ultrasonic sensor is not in the long distance mode, corresponding to "NO" at S540, process proceeds to S545. The ECU 3 outputs the long distance mode setting command to the i-th ultrasonic sensor at S545, and process returns to S520. When it is determined that the i-th ultrasonic sensor is in the long distance mode, corresponding to "YES" at S540, process returns to S520 with S545 skipped.

In the above manners, the processes S520 to S525 are performed the given number of times. The given number is equal to the number "n" of the controlled objects. As a result, sensor by sensor, the operational mode (i.e., the long distance mode and the short distance mode) of each of the first to n-th ultrasonic sensor is individually set. When it is determined at S520 that the loop processing has been performed the given number of times, procedure routine associated with FIG. 9 returns.

When it is determined at S505 that no change is made in the active control setting, the above processes are performed. On the other hand, when it is determined that a change in the active control setting is made, corresponding to "YES" at S505, process proceeds to S550. At S550, the ECU 3 determines whether the active control is switched from "OFF" into "ON" or from "ON" into "OFF".

When it is determined that the active control is switched from "ON" into "OFF", corresponding to "NO" at S550, process proceeds to S555. At S555, the ECU 3 outputs the short distance mode setting command to the first to n-th ultrasonic sensors to set the operational mode to the short distance mode. Process routine relevant to FIG. 8 returns.

When it is determined that the active control is switched into "ON", corresponding to "YES" at S550, process proceeds to the above-described S515 to set the operational mode of corresponding ultrasonic sensor taking into account the present distance D to an obstacle. According to the above manners, when it is determined that the distance D to an obstacle is less than or equal to the threshold D1, the operational mode of corresponding ultrasonic sensor is set to the short distance mode. On the other hand, when it is determined that the distance D to an obstacle is larger than the threshold D1, the operational mode of corresponding ultrasonic sensor is set to the long distance mode.

As explained above, according to the obstacle detection apparatus 1 in the present embodiment, characteristic of the ultrasonic sensors 5 are dynamically switched after the obstacle detection operation is started. Therefore, the obstacle detection apparatus 1 is capable of detecting both a relatively distant obstacle and a relatively nearby obstacle. Further, it is possible to restrict error detection in detecting a relatively distant obstacle. Further, it is possible to reduce an undetectable area in detecting a relatively close obstacle.

Also, the above obstacle detection apparatus 1 changes a directivity and a sensing distance of the ultrasonic sensor 5 based on a distance to an obstacle. Therefore, when it is determined that an obstacle is located close to the vehicle, it is possible to reduce an undetectable area and to detect an obstacle with high accuracy. Also, when it is determined that an obstacle is located distant from the vehicle, in detecting an distance obstacle, it is possible to restrict error detection by providing the ultrasonic sensors 5 with a high directivity.

Moreover, according to the above obstacle detection apparatus 1, it is possible for a user to arbitrarily set whether to change the directivity and the sensing distance of the ultrasonic sensor 5, using the active control setting switch 15.

According to the obstacle detection apparatus 1 in the present embodiment, the operational mode is switched on the basis of the threshold distance D1. Alternatively, an obstacle detection apparatus 1 may be configured to operate as follows. When the distance D to an obstacle reaches a first predetermined distance from a shorter distance, the ECU 3 may cause the ultrasonic sensor 5 to operate in the long distance mode. When the distance D to an obstacle reaches a second predetermined distance from a longer distance, the ECU 3 causes the ultrasonic sensor 5 to operate in the short distance mode. In the above configuration, the first predetermined distance may be larger than the second predetermined distance, and thus, a condition for switching the operational mode may have hysteresis. With hysteresis, when the distance to an obstacle fluctuates around a threshold, it is possible to restrict the frequent and repeated switching of the operational mode.

Third Embodiment

Explanation on a third embodiment is described below.

Figure 10A:
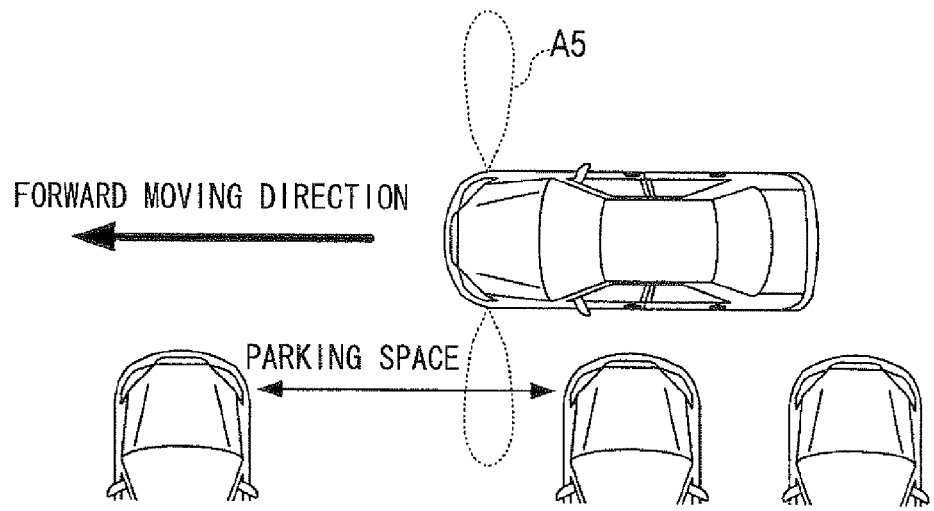
FIGS. 10A and 10B are explanatory diagrams associated with a parking assist system.
Figure 10B:
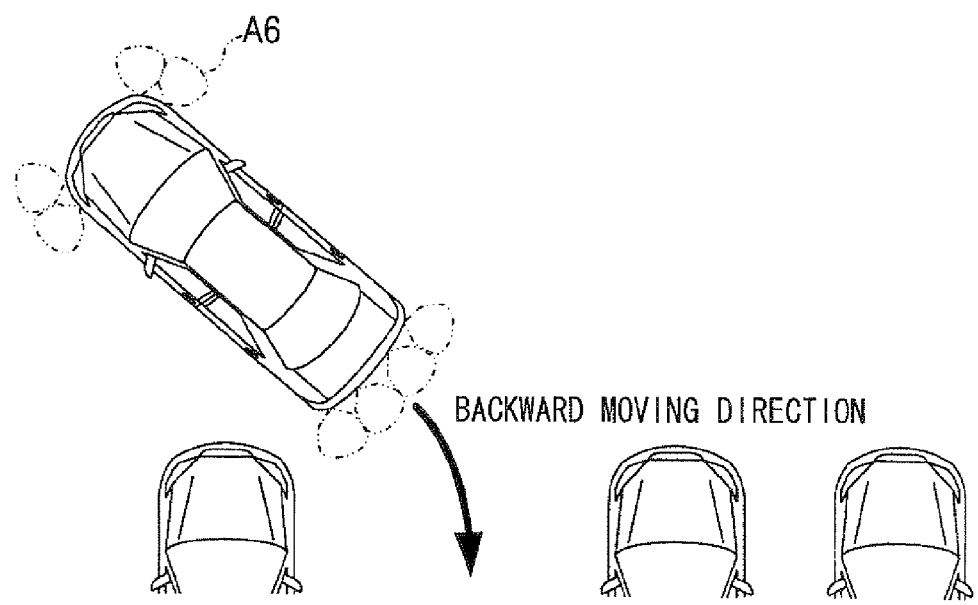

According to the third embodiment, the above-described obstacle detection apparatus 1 is built into a parking assistance system. When this parking assistance system is activated, the parking assistance system searches for a parking space existing sideward of the vehicle (e.g., refer to A5 in FIG. 10A) while the vehicle is moving forwards, as shown in FIG. 10A. Then, when a user performs an operation for commanding the vehicle to enter a parking space, the vehicle enters a parking space while moving backward, as shown in FIG. 10B.

According to the parking assistance system that operates in the above manners, when the vehicle moves forwards, it is necessary to recognize a parked vehicle located relatively distant from the vehicle, and it is necessary to search for a parking space. In the above case, therefore, it is preferable that the search is made in the above-described long distance mode to restrict error detection (c.f., a sensing range A5 illustrated in FIG. 10A).

When the vehicle moves backward to enter the parking space, an obstacle approaches the vicinity of the vehicle. In this case, it may preferable that obstacle detection is made in the short distance mode to reduce an undetectable area (c.f., a sensing range A6 illustrated in FIG. 10B).

Figure 11:
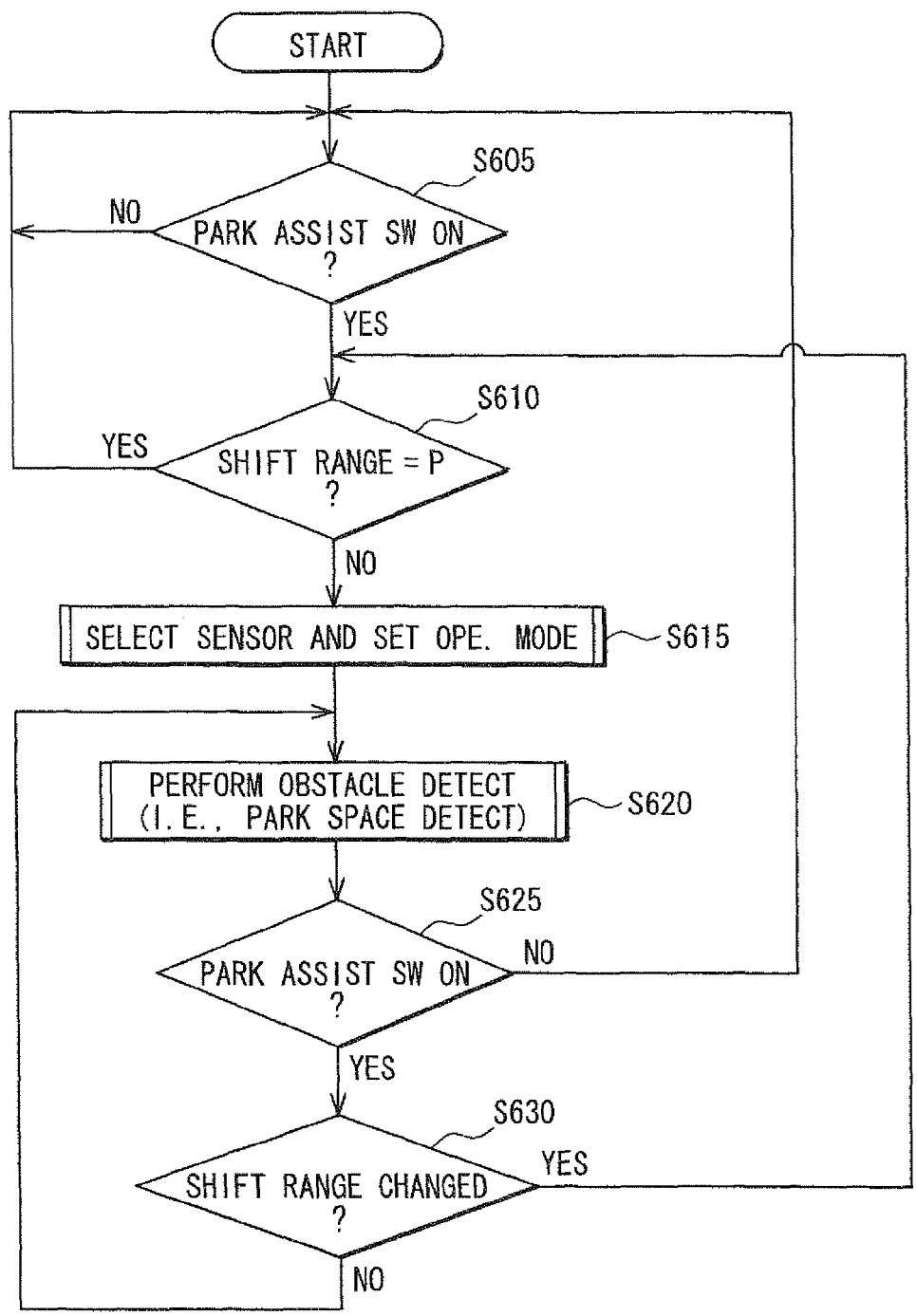
FIG. 11 is a flow chart associated with a parking assist system control operation.

In view of the above, according to the present embodiment, the following procedures are performed to switch the operation mode of the ultrasonic sensors 5. FIG. 11 is a flow chart illustrating procedures for switching the operational mode. The procedures are associated with the parking assistance system. The procedures associated with FIG. 11 ends when an ignition switch is turned off.

When the procedures associated with FIG. 11 are started, the ECU 3 determines at S605 whether a parking assistance system activation switch 14 is in an ON state or not, as shown in FIG. 11. A user can arbitrarily operate the parking assistance system activation switch 14. Thus, the parking assistance system activation switch 14 may be switched on when a user requires the parking assistance system to activate.

When it is determined at S605 that the parking assistance system activation switch 14 is in the on state, corresponding to "YES" at S605, procedure proceeds to S610. At S610, the ECU 3 determines whether the shift range is in "P" or not When it is determined at S605 that the parking assistance system activation switch 14 is in the on state, corresponding to "YES" at S605, procedure proceeds to S610. At S610, the ECU 3 determines whether the shift range is in "P" or not.

When it is determined that the shift range is not in "P", corresponding to "NO" at S610, procedure returns to S610. Procedures S605 and S610 are repeatedly performed until both of the following two conditions are met. The one condition is that the parking assistance system activation switch 14 is in "ON". The other condition is that the shift range is in "P".

When it is determined at S610 that the shift range is in "P", corresponding to "YES" at S610, procedure proceeds to S615. At S615, the ECU 3 selects ultrasonic sensors that correspond to a position of the shift range, and further set the operational mode of the ultrasonic sensors. The procedure at S615 includes processes shown in, for example, FIG. 12.

At S705, the ECU 3 determines whether the shift range is in "R" or not. When it is determined that the shift range is in "R", corresponding to "YES" at S705, process proceeds to S710. At S710, the ECU 3 set the variable "n" to 8 and selects all of the first to eighth ultrasonic sensors 5(51-58) as controlled objects. At S715, the ECU 3 outputs the short distance mode setting command to each of the first to n-th ultrasonic sensors and sets the operational mode all ultrasonic sensors 5(51-58) to the short distance mode. Then, process routine associated with FIG. 12 returns.

When it is determined that the shift range is not in "R", corresponding to "YES" at S705, procedure proceeds to S720. At S720, the ECU 3 sets the variable "n" to "2" and selects the first and second ultrasonic sensors as the controlled objects for searching for a parking space. At S725, the ECU 3 outputs the long distance mode setting command to the first to n-th ultrasonic sensors and sets the operational mode of the two ultrasonic sensors to the long distance mode. Then, process routine associated with FIG. 12 returns.

Figure 12:
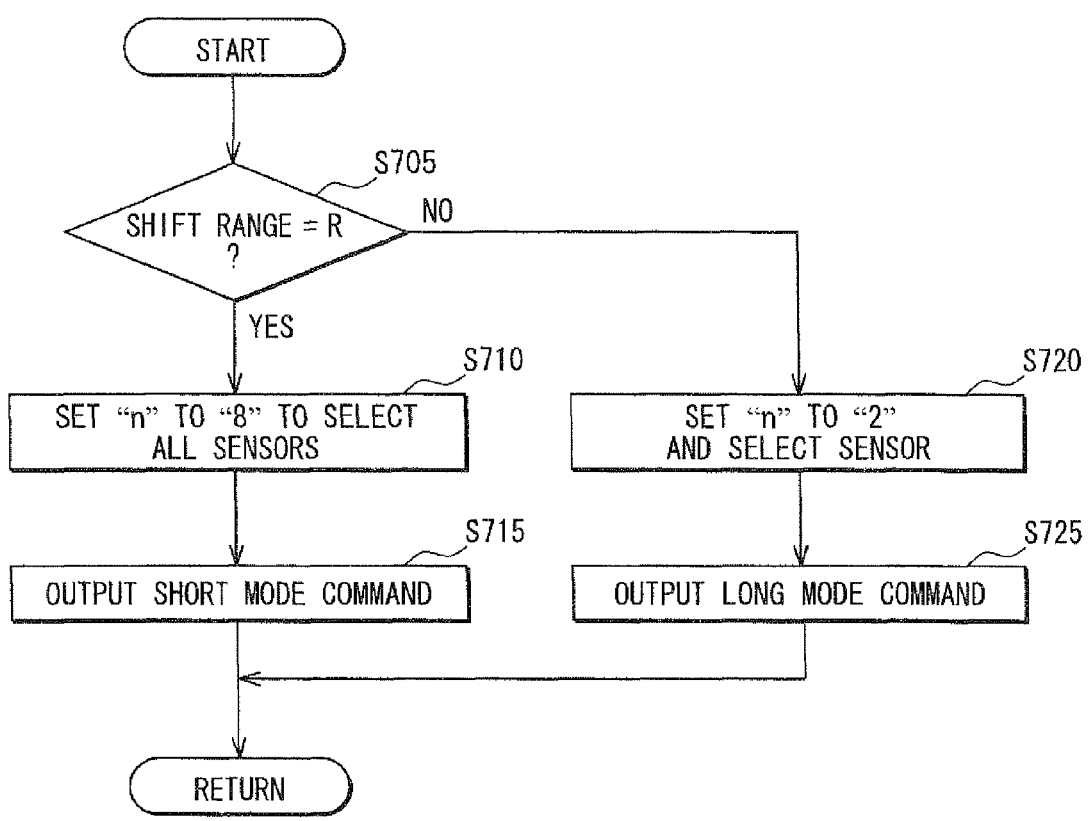
FIG. 12 is a flow chart associated with a procedure for selecting an ultrasonic sensor corresponding to a shift range position and for setting an operational mode of an ultrasonic sensor.

Return of process routine associated with FIG. 12 corresponds to finish of procedure S615. Procedure proceeds to S620. At S620, the ECU 3 performs an obstacle detection (i.e., a parking space search procedure) procedure. Processes in the procedure S620 are similar to the above-explained processes S305 to S340. In the procedure S620, each of the first to n-th ultrasonic sensors transmits an ultrasonic wave and receives the reflected ultrasonic wave. The first to n-th ultrasonic sensors individually detect a presence of an obstacle and a distance to the obstacle on the basis of the result of the transmission and reception of the ultrasonic wave.

Then, based on the information on the obstacle obtained at S310, search for a parking space is made and obstacle detection is made.

When procedure S620 finishes, the ECU determines at S625 whether the parking assistance system activation switch 14 is in the on state or not. When it is determined that the parking assistance system activation switch 14 is not in the on state, corresponding to "NO" at S625, it is likely that a user has switched off the parking assistance system activation switch 14. In this case, procedure returns to S605, and procedure waits until the parking assistance system activation switch 14 is switched on.

When it is determined at S625 that the parking assistance system activation switch 14 is in the on state, corresponding to "YES" at S625, procedure proceeds to S630. At S630, the ECU 3 determines whether the shift range in the transmission device 12 is switched or not. More specifically, at S630, positions of the shift range are classified into three predetermined group. When the shift range is switched from a position in one predetermined group to a position in another predetermined group, it is determined at S630 that the shift range is switched. Herein, the three predetermined groups of shift range positions are a first group of shift range positions, a second group of shift range positions, and a third group of shift range positions, respectively. The first predetermined group of shift range position includes, for example, a position "P". The second predetermined group of shift range positions includes, for example, a position "R". The third predetermined group of shift range position includes positions other than "P" and "R" (e.g., "N", "D", "B", etc.).

When it is determined that the shift range is switched, corresponding to "YES" at S630, procedure returns to S610 because it may be necessary to switch the operational mode and to change the controlled objects. After procedure returns to S610, when the shift range is switched in "P", process further returns to S605. Meanwhile, when the shift range is switched in a position other than "P", procedure proceeds to S615 where the controlled objects (i.e., ultrasonic sensor) are selected again and the operational mode is switched.

When it is determined at S630 that the shift range is not switched, corresponding to "NO" at S630, procedure returns to S620. Then, procedure routine S125 to S140 are repeatedly performed unless the clearance sonar activation switch 13 is switched off, or unless the shift range is switched. As a result, the obstacle detection procedure S125 is repeatedly performed.

According to the obstacle detection apparatus in the third embodiment, as explained above, characteristics of the ultrasonic sensors 5 are dynamically switched after an obstacle detection operation is started. Therefore, it is possible to detect both a relatively distance obstacle and a relatively nearby obstacle. It is possible to restrict error detection in detecting a relatively distant obstacle. In addition, it is possible to reduce an undetectable area in detecting a relatively nearby obstacle.

According to the above obstacle detection apparatus 1, the directivity and the sensing distance of each ultrasonic sensor 5 are changed based on a moving direction of the vehicle. Therefore, it is possible to dynamically optimize the sensing range for obstacle detection in accordance with the moving direction of the vehicle.

Modification Embodiment

According to the above-described embodiments, the directivity and the sensing distance of the ultrasonic sensor are changed when a predetermined condition for switching the operational mode is met after an obstacle detection operation is started. The above switching is made on the basis of either the vehicle speed, the distance to an obstacle, or the moving direction of the vehicle. Alternatively, the above switching may be made on the basis of another switching condition. Alternatively, the above switching may be made on the basis of combination of the above-described conditions such as combination of the speed of the vehicle and the moving direction of the vehicle.

Alternatively, the directivity and the sensing distance of the ultrasonic sensor may be changed on the basis of a time-based condition. More specifically, the ECU 3 (i.e., control means) may repeatedly command the ultrasonic sensor to change the directivity and the sensing distance at regular intervals or at irregular intervals through time.

In the above case, it may be possible to switch a characteristic of the ultrasonic sensor at regular intervals or at irregular intervals according to divided times. When an obstacle detection apparatus is configured to switch a characteristic of the ultrasonic sensor at short time intervals, it may be possible for such an obstacle detection apparatus to apparently function as an obstacle detection apparatus having multiple ultrasonic sensors with different characteristics.

Further, according to the above-described embodiments, the operational mode is switched between the two modes (i.e., between the long distance mode and the short distance mode). Alternatively, an obstacle detection apparatus may be configured such that the operational mode is switched between three or more modes. For example, the operational mode may be switched between there modes (e.g., between a long distance mode, a medium distance mode and a short distance mode). Herein, the directivity and the sensing distance in the medium distance mode may be between those in the long distance mode and those in the short distance mode. Alternatively, the operational mode may be switched between five modes. In the above five mode, an addition mode may be set between the long distance mode and the medium distance mode, and another additional mode may be set between the medium distance mode and the short distance mode. In the above cases, multiple conditions for switching the operational mode may be set, and thereby, it may be possible to switch the operational mode in sensitive or detail manners.

In view of the above-described obstacle detection apparatus, an obstacle detection apparatus for a vehicle is provided. The apparatus includes an ultrasonic sensor 5 and a controller 3. The ultrasonic sensor 5 detects a presence of an obstacle around the vehicle and a distance to the obstacle by transmitting an ultrasonic wave and receiving the ultrasonic wave reflected by the obstacle. The controller 3 controls the ultrasonic sensor 5. The ultrasonic sensor 5 includes an ultrasonic wave element. The ultrasonic wave element has multiple resonance modes. The ultrasonic sensor 5 changes a directivity of the ultrasonic sensor 5 by selecting one of the multiple resonance modes of the ultrasonic wave element in accordance with a command signal output from the controller 3.

According to the above obstacle detection apparatus, the ultrasonic sensor 5 may change a sensing distance of the ultrasonic sensor in accordance with the command signal output from the controller. The controller may be configured to command the ultrasonic sensor to change the directivity and the sensing distance of the ultrasonic sensor when a predetermined condition is met after the ultrasonic sensor 5 starts detecting the obstacle.

According to the above obstacle detection apparatus, the ultrasonic wave element may be a single element in the ultrasonic sensor for transmitting the ultrasonic wave. The directivity of the ultrasonic sensor may be changed in accordance with a change in a driving frequency of the single element.

According to the above obstacle detection apparatus, the controller 3 may command the ultrasonic sensor 5 to change the directivity and the sensing distance of the ultrasonic sensor 5 based on a speed of the vehicle. The ultrasonic sensor 5 may have a first directivity, a second directivity, a first sensing distance and a second sensing distance. The first directivity may be higher than the second directivity. The first sensing distance may be longer than the second sensing distance. When the speed of the vehicle reaches a first predetermined threshold by acceleration of the vehicle, the controller 3 may command the ultrasonic sensor 5 to have the first directivity and the first sensing distance. When the speed of the vehicle reaches a second predetermined threshold by deceleration of the vehicle, the controller 3 may command the ultrasonic sensor 5 to have the second directivity and the second sensing distance. The first predetermined threshold may be larger than the second predetermined threshold.

According to the above obstacle detection apparatus, the controller 3 may be configured to command the ultrasonic sensor 5 to change the directivity and the sensing distance of the ultrasonic sensor 5 based on the distance to the obstacle detected with the ultrasonic sensor 5. The ultrasonic sensor 5 may have a first directivity, a second directivity, a first sensing distance and a second sensing distance. The first directivity may be higher than the second directivity. The first sensing distance may be longer than the second sensing distance. When the distance to the obstacle reaches a third predetermined threshold with an increase in the distance to the obstacle, the controller 3 may command the ultrasonic sensor 5 to have the first directivity and the first sensing distance. When the distance to the obstacle reaches a fourth predetermined threshold with a decrease in the distance to the obstacle, the controller 3 may command the ultrasonic sensor 5 to have the second directivity and the second sensing distance. The third predetermined threshold may be larger than the fourth predetermined threshold.

According to the above obstacle detection apparatus, the controller 3 may be configured to command the ultrasonic sensor 5 to change the directivity and the sensing distance the ultrasonic sensor 5 based on a moving direction of the vehicle. The ultrasonic sensor 5 may have a first directivity, a second directivity, a first sensing distance and a second sensing distance. The first directivity may be higher than the second directivity. The first sensing distance may be longer than the second sensing distance. When the vehicle moves forward, the controller 3 may command the ultrasonic sensor 5 to have the first directivity and the first sensing distance. When the vehicle moves backward, the controller 3 may command the ultrasonic sensor 5 to have the second directivity and the second sensing distance.

According to the above obstacle detection apparatus, the obstacle detection apparatus may further include a set device 21 for switching on and off an operation for changing the directivity and the sensing distance of the ultrasonic sensor 5.

According to the above obstacle detection apparatus, the plurality of resonance modes of the ultrasonic wave element may include a high frequency mode and a low frequency mode. The ultrasonic sensor 5 may select and use the high resonance mode to sense a distant obstacle. The ultrasonic sensor 5 may select and use the low resonance mode to sense a close obstacle.

While the invention has been described with reference to preferred embodiments thereof, it is to be understood that the invention is not limited to the preferred embodiments and construction. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An obstacle detection apparatus for a vehicle, the apparatus comprising:
   an ultrasonic sensor that detects a presence of an obstacle around the vehicle and a distance to the obstacle by transmitting an ultrasonic wave and receiving the ultrasonic wave reflected by the obstacle; and
   a controller that controls the ultrasonic sensor, wherein:
   the ultrasonic sensor includes an ultrasonic wave element;
   the ultrasonic wave element has a plurality of resonance modes;
   the ultrasonic sensor changes a directivity of the ultrasonic sensor by selecting one of the plurality of resonance modes of the ultrasonic wave element in accordance with a command signal output from the controller;

the ultrasonic sensor changes a sensing distance of the ultrasonic sensor in accordance with the command signal output from the controller;

the controller is configured to command the ultrasonic sensor to change the directivity and the sensing distance of the ultrasonic sensor when a predetermined condition is met after an obstacle detection operation is started; and the controller is configured to command the ultrasonic sensor to change the directivity and the sensing distance of the ultrasonic sensor based on the distance to the obstacle detected with the ultrasonic sensor.

2. The obstacle detection apparatus according to claim 1, wherein:

the ultrasonic wave element is a single element in the ultrasonic sensor for transmitting the ultrasonic wave; and the directivity of the ultrasonic sensor is changed in accordance with a change in a driving frequency of the single element.

3. The obstacle detection apparatus according to claim 1, wherein:

the controller commands the ultrasonic sensor to change the directivity and the sensing distance of the ultrasonic sensor based on a speed of the vehicle.

4. The obstacle detection apparatus according to claim 3, wherein:

the ultrasonic sensor has a first directivity, a second directivity, a first sensing distance and a second sensing distance;

the first directivity is higher than the second directivity;

the first sensing distance is longer than the second sensing distance;

when the speed of the vehicle reaches a first predetermined threshold by acceleration of the vehicle, the controller commands the ultrasonic sensor to have the first directivity and the first sensing distance;

when the speed of the vehicle reaches a second predetermined threshold by deceleration of the vehicle, the controller commands the ultrasonic sensor to have the second directivity and the second sensing distance; and the first predetermined threshold is larger than the second predetermined threshold.

5. The obstacle detection apparatus according to claim 1, wherein:

the ultrasonic sensor has a first directivity, a second directivity, a first sensing distance and a second sensing distance;

the first directivity is higher than the second directivity;

the first sensing distance is longer than the second sensing distance;

when the distance to the obstacle reaches a third predetermined threshold with an increase in the distance to the obstacle, the controller commands the ultrasonic sensor to have the first directivity and the first sensing distance;

when the distance to the obstacle reaches a fourth predetermined threshold with a decrease in the distance to the obstacle, the controller commands the ultrasonic sensor to have the second directivity and the second sensing distance; and the third predetermined threshold is larger than the fourth predetermined threshold.

6. The obstacle detection apparatus according to claim 1, wherein:

the controller is configured to command the ultrasonic sensor to change the directivity and the sensing distance of the ultrasonic sensor based on a moving direction of the vehicle.

7. The obstacle detection apparatus according to claim 6, wherein:

the ultrasonic sensor has a first directivity, a second directivity, a first sensing distance and a second sensing distance;

the first directivity is higher than the second directivity;

the first sensing distance is longer than the second sensing distance;

when the vehicle moves forward, the controller commands the ultrasonic sensor to have the first directivity and the first sensing distance; and when the vehicle moves backward, the controller commands the ultrasonic sensor to have the second directivity and the second sensing distance.

8. The obstacle detection apparatus according to claim 1, further comprising:

a set device for switching on and off an operation for changing the directivity and the sensing distance of the ultrasonic sensor.

9. The obstacle detection apparatus according to claim 1, wherein:

the plurality of resonance modes of the ultrasonic wave element includes a high frequency mode and a low frequency mode;

the ultrasonic sensor selects and uses the high resonance mode to sense a distant obstacle; and the ultrasonic sensor selects and uses the low resonance mode to sense a nearby obstacle.

10. An obstacle detection apparatus for a vehicle, the apparatus comprising:

an ultrasonic sensor that transmits and receives an ultrasonic wave to search for an obstacle, wherein the ultrasonic sensor has a plurality of operational modes to changes both a directivity and a sensing distance of the ultrasonic sensor; and a controller that causes the ultrasonic sensor to change the directivity and the sensing distance of the ultrasonic sensor if a predetermined condition is met after the ultrasonic sensor starts searching for the obstacle, wherein when the ultrasonic sensor senses the obstacle, the ultrasonic sensor detects a distance to the obstacle;

the plurality of operational modes of the ultrasonic sensor includes a long distance mode and a short distance mode;

the directivity of the ultrasonic sensor in the long distance mode is higher than that in the short distance mode;

the sensing distance of the ultrasonic sensor in the long distance mode is longer than that in the short distance mode;

when the distance to the obstacle reaches a first predetermined distance with an increase in the distance to the obstacle, the controller causes the ultrasonic sensor to operate in the long distance mode;

when the distance to the obstacle reaches a second predetermined distance with a decrease in the distance to the obstacle, the controller causes the ultrasonic sensor to operate in the short distance mode; and the first predetermined distance is larger than the second predetermined distance.

11. The obstacle detection apparatus according to claim 10, wherein:

when the speed of the vehicle reaches a first predetermined speed with an increase in the speed of the vehicle, the controller causes the ultrasonic sensor to operate in the long distance mode;

when the speed of the vehicle reaches a second predetermined speed with a decrease in the speed of the vehicle, the controller causes the ultrasonic sensor to operate in the short distance mode; and the first predetermined speed is faster than the second predetermined speed.

12. The obstacle detection apparatus according to claim 10, wherein:

when the vehicle moves forward, the controller causes the ultrasonic sensor to operate in the long distance mode; and when the vehicle moves backward, the controller causes the ultrasonic sensor to operate in the short distance mode.

13. The obstacle detection apparatus according to claim 10, wherein:

the controller causes the ultrasonic sensor to alternately operate in the long and short distance modes at regular or irregular time intervals.

* * * * *